United States Patent
Dupont et al.

(10) Patent No.: US 12,039,327 B2
(45) Date of Patent: Jul. 16, 2024

(54) USAGE-BASED OPTIMIZATION OF SOFTWARE CONFIGURATIONS

(71) Applicant: Oracle International Corporation, Redwood Shores, CA (US)

(72) Inventors: Joel Dupont, Mountain View, CA (US); John A. Cafolla, Mountain View, CA (US); Jamie Archer, Bucharest (RO); Tudor Barbulescu, Bucharest (RO)

(73) Assignee: Oracle International Corporation, Redwood Shores, CA (US)

( * ) Notice: Subject to any disclaimer, the term of this patent is extended or adjusted under 35 U.S.C. 154(b) by 71 days.

(21) Appl. No.: 17/981,995

(22) Filed: Nov. 7, 2022

(65) Prior Publication Data

US 2024/0152355 A1  May 9, 2024

(51) Int. Cl.
*G06F 9/44* (2018.01)
*G06F 8/71* (2018.01)

(52) U.S. Cl.
CPC ..................... *G06F 8/71* (2013.01)

(58) Field of Classification Search
None
See application file for complete search history.

(56) References Cited

U.S. PATENT DOCUMENTS

| | | | | |
|---|---|---|---|---|
| 10,877,747 B1 * | 12/2020 | Sebilleau | | G06F 8/71 |
| 11,593,096 B1 * | 2/2023 | Chaptini | | G06F 8/77 |
| 2012/0066620 A1 * | 3/2012 | Teng | | G06F 9/451 |
| | | | | 715/762 |
| 2012/0311012 A1 | 12/2012 | Mazhar et al. | | |
| 2013/0111257 A1 | 5/2013 | Broda et al. | | |
| 2016/0164723 A1 | 6/2016 | Cimprich et al. | | |
| 2018/0321833 A1 * | 11/2018 | Nelson | | G06F 16/27 |
| 2022/0058065 A1 * | 2/2022 | Kiefer | | G06F 9/541 |
| 2022/0067620 A1 | 3/2022 | Thornhil et al. | | |

OTHER PUBLICATIONS

AU 2016226172, English text (Year: 2017).*
"An Overview of the AWS Cloud Adoption Framework", Nov. 22, 2021, pp. 35.
"AWS Prescriptive Guidance Foundation playbook for AWS large migrations", Feb. 2022, 49 Pages.
(Continued)

*Primary Examiner* — Insun Kang
(74) *Attorney, Agent, or Firm* — Invoke

(57) ABSTRACT

Techniques for configuring a software system include generating a hierarchy of entities representing usage of the software system by a set of users, wherein the hierarchy includes a first set of nodes representing a set of tasks, a second set of nodes representing a set of components that implement the tasks, and a set of edges between the first set of nodes and the second set of nodes. The techniques also include updating the hierarchy based on a first set of configurations for the tasks, wherein the updated hierarchy indicates one or more tasks that have been enabled for the users. The techniques further include determining, based on the updated hierarchy, one or more components that implement the task(s). Finally, the techniques include generating, based on the hierarchy, one or more runbooks that execute the task(s) using the component(s).

18 Claims, 4 Drawing Sheets

(56) References Cited

OTHER PUBLICATIONS

"AWS Prescriptive Guidance Setting up an agile program to accelerate cloud migrations", Aug. 2019, 20 Pages.
"Azure Monitor Workbooks data sources", Retrieved from https://learn.microsoft.com/en-us/azure/azure-monitor/visualize/workbooks-data-sources, Retrieved on Mar. 2, 2022, 10 Pages.
"Cloud adoption", Retrieved from https://www.dynatrace.com/solutions/enterprise-cloud-adoption/, Retrieved on Aug. 8, 2022, 17 Pages.
"Implementing Order Management", Retrieved from https://docs.oracle.com/en/cloud/saas/supply-chain-management/22d/faiom/index.html#FAIOM2572218, Retrieved on Feb. 6, 2022, 95 Pages.
Carlisle J., "AppDynamics the Only Application Performance Monitoring Vendor in the Microsoft Cloud Adoption Framework", Retrieved from https://www.appdynamics.com/blog/cloud/cloud-adoption-framework-apm/, Feb. 10, 2021, 4 Pages.

* cited by examiner

USAGE-BASED OPTIMIZATION OF SOFTWARE CONFIGURATIONS

TECHNICAL FIELD

The present disclosure relates to software configuration. In particular, the present disclosure relates to usage-based optimization of software configurations.

BACKGROUND

Advances in technology have lead to an increase in the available options for configuring software systems. For example, a cloud-based and/or distributed software system may include multiple discrete modules that provide different sets of functionality within the software system. Each module may include components that implement various features or capabilities provided by the module. The modules and/or components may additionally interact with one another to implement complex workflows and/or higher-level features or functionality provided by the software system.

Conventional techniques for configuring a software system typically involve setting up individual components or features within the software system. However, these techniques fail to account for higher-level usage or behavior associated with the software system. For example, a user may interact with a sequential setup task list to configure a software system. The task list may be used to configure individual workflows, data objects, or other low-level components of the software system for the user. Because the task list is used to perform low-level technical implementation or setup within the software system, the software system, as implemented, may fail to behave or operate in a manner that is expected or intended by the user. This suboptimal configuration of the software system may also interfere with the efficient setup or execution of the software system. For example, a workflow for performing a task within the software system may be created identifying a module in the software system that provides functionality related to the task and configuring a set of objects or components within the module. However, the task may require only a fraction of the configured objects or components. Consequently, additional processor, memory, storage, network, and/or other computational resources may be consumed in configuring, initializing, and/or executing other objects or components in the same module that are not needed to perform the task.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
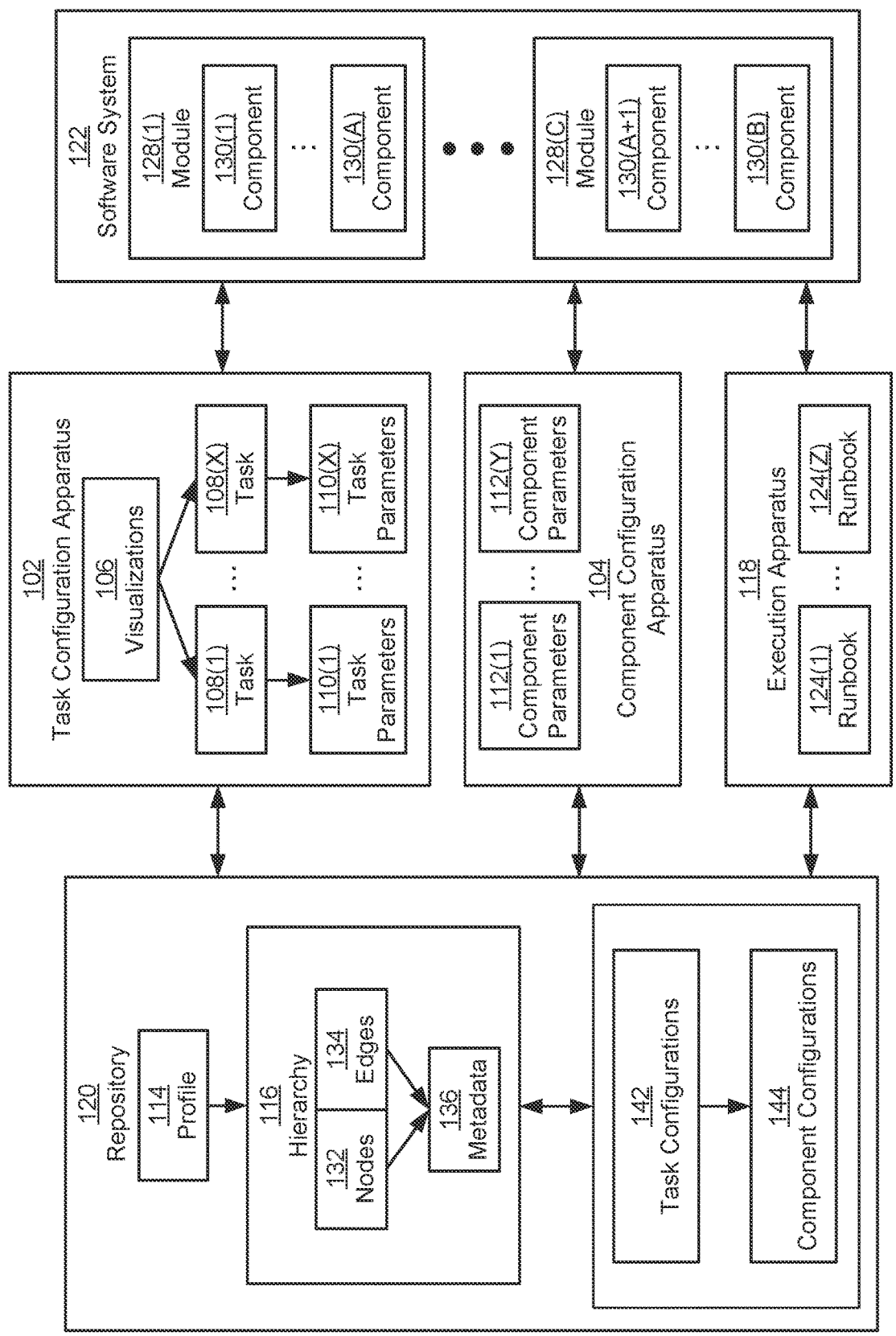
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. USAGE-BASED OPTIMIZATION OF SOFTWARE CONFIGURATIONS
4. EXAMPLE EMBODIMENT
5. OPTIMIZING A CONFIGURATION OF A SOFTWARE SYSTEM
6. COMPUTER NETWORKS AND CLOUD NETWORKS
7. MISCELLANEOUS; EXTENSIONS
8. HARDWARE OVERVIEW

1. General Overview

Techniques for perform usage-based optimization of software configurations are disclosed. A software system includes multiple modules or components that implement features or functionality exposed to a set of users. For example, the software system may be used to perform batch data processing, transaction processing, and/or scheduled tasks for the users.

More specifically, the disclosed techniques use a hierarchy of entities related to the functionality and usage of the software system to track and manage the configuration, implementation, and execution of various components or modules within the software system for a given set of users. The hierarchy includes nodes representing the entities and edges representing relationships between the entities. For example, the hierarchy may include nodes representing organizations, users, environments, applications, integrations, modules, components, workflows, features, activities, processes, and/or other entities involved in implementing or using the software system. The nodes may be arranged across multiple levels of the hierarchy, with a node at a certain level of the hierarchy connected to one or more nodes in a higher level of the hierarchy and/or one or more nodes in a lower level of the hierarchy via a set of edges. An edge that connects a first node representing a first entity at a higher level in the hierarchy and a second node representing a second entity at a lower level in the hierarchy may indicate that the second entity is grouped under the first entity, belongs to the first entity, is managed by the first entity, is a part of the first entity, or has another type of parent-child relationship with the first entity.

The hierarchy is initially created or instantiated based on a profile that reflects the intended use of the software system by the set of users. For example, the profile may include an industry, structure, size, location, and/or another attribute of an organization to which the users belong. In another example, the profile may include demographic attributes, preferences, roles, usage requirements, and/or other attributes of individual users of the software system. The attributes in the profile may be matched to a template for the hierarchy, and the hierarchy may be populated with nodes and/or edges from the template.

The nodes and/or edges in the hierarchy may also include metadata that is initialized with values from the template. This metadata may include parameters that specify whether a certain task or component is enabled, disabled, required, or optional. The parameters may also, or instead, include a default adoption method for a task, a default user or user role involved in setting up or performing the task, and/or other attributes related to the task.

The hierarchy is also updated to reflect configurations associated with tasks to be performed by the set of users using the software system. For example, a user may interact with a user interface to view one or more visual representations of the hierarchy; use the visual representations to identify components of the software system that are used to perform the tasks; enable or disable individual tasks or components; specify an adoption method associated with a task; or specify a user or user role involved in performing a task or configuring a component. As the user provides input via the user interface, metadata corresponding to the input is added to nodes and/or edges of the hierarchy.

After configuration of the tasks is complete, components that implement the tasks are identified and configured using the hierarchy. For example, the hierarchy may include edges between a first set of nodes representing the tasks and a second set of nodes representing components that implement the tasks. These edges may be used to identify one or more components that are required to implement each task. The component(s) may additionally be configured by the respective users or user roles via a user interface. As a user provides input for configuring a given component through the user interface, one or more nodes and/or edges associated with the component within the hierarchy may be updated with metadata corresponding to the input.

The hierarchy is additionally used to orchestrate the setup of runbooks that carry out the tasks for the users. For example, nodes and/or edges in the hierarchy may be used to identify tasks and/or components that have been enabled and configured by the users. Metadata corresponding to configurations of the tasks, features, and/or components may be retrieved from the nodes and/or edges and used to set up, schedule, or automate processes that carry out the tasks using the components. Consequently, the hierarchy represents a "map" that is used to guide, track, and visualize the end-to-end process of determining the usage of the software system by a set of users, configuring the software system for use by the users, and executing the software system.

Advantageously, the hierarchy provides a centralized and up-to-date view and/or representation of a software system as the software system is adopted by a set of users, configured according to the users' needs and requirements, implemented to meet technical requirements, and executed by or for the users. The hierarchy can thus be used to setup, configure, and execute components within the software system in a way that reflects the intended usage of the software system, unlike conventional approaches that configure individual components without assessing how the configured components are used by or affect the behavior of the corresponding software system. Further, because the hierarchy matches tasks to be performed by the users to components required to implement the tasks, the software system can be configured, implemented, and/or executed more efficiently than conventional techniques that involve the configuration and/or execution of a larger number of components that required to implement various capabilities.

One or more embodiments described in this Specification and/or recited in the claims may not be included in this General Overview section.

2. Architectural Overview

FIG. 1 illustrates a system in accordance with one or more embodiments. As illustrated in FIG. 1, the system includes a task configuration apparatus 102, a component configuration apparatus 104, and an execution apparatus 118. Each of these components is described in further detail below.

In some embodiments, task configuration apparatus 102, component configuration apparatus 104, and execution apparatus 118 perform end-to-end configuration and execution of a software system 122. Software system 122 includes an application, a database, a software suite, a framework, a cloud computing system, a distributed system, an operating system, and/or another collection of software-based modules 128(1)-128(C) (each of which is referred to individually as module 128).

Each module 128 represents a discrete set of functionality within software system 122. For example, each module 128 may implement one or more workflows (e.g., batch processing workflows, data workflows, machine learning workflows, application workflows, etc.), a layer in a software or technology stack, an interface, an application within a software suite, a library, a data store, and/or another independent subset of functionality associated with software system 122.

Each module 128 in software system 122 includes a corresponding set of components 130(1)-130(A) and 130(A+1)-130(B). More specifically, module 128(1) is implemented using one set of components 130(1)-130(A), and module 128(C) is implemented using a different set of components 130(A+1)-130(B). Each of components 130(1)-130(A) and 130(A+1)-130(B) is referred to individually as component 130. Components 130 include user interface (UI) components, services, service endpoints, widgets, timers, threading assistants, servers, frontend components, filesystems, data stores, data objects, and/or other parts of software system 122 that execute and/or interact with one another to implement the functionality of the corresponding modules 128.

In some embodiments, task configuration apparatus 102, component configuration apparatus 104, and execution apparatus 118 use a hierarchy 116 of entities related to the functionality and usage of software system 122 to manage and/or track the configuration, implementation, and execution of various components 130 or modules 128 within software system 122 for a given set of users. As shown in FIG. 1, hierarchy 116 is stored in a repository 120 with a set of associated task configurations 142 and a set of associated component configurations 144. For example, repository 120 may store hierarchy 116, task configurations 142, and component configurations 144 in one or more files, tables, data structures, and/or other formats.

More specifically, task configuration apparatus 102, component configuration apparatus 104, and execution apparatus 118 use hierarchy 116 to track and manage the configuration, implementation, and execution of various components 130 and/or modules 128 within software system 122 for the set of users. Task configuration apparatus 102 performs task configurations 142 of tasks 108(1)-108(X) (each of which is referred to individually as task 108) that can be performed using software system 122. For example, task configuration apparatus 102 may provide a user interface that allows a user to view a list of tasks 108 that can be performed using software system 122; enable or disable various tasks 108 and/or components 130 used to implement tasks 108; assign the configuration or execution of tasks 108 and/or components 130 to various users or user roles; and/or specify other task parameters 110(1)-110(X) (each of which is referred to individually as task parameters 110) that reflect the intended use of software system 122 by the users. As various sets of task parameters 110 are received from the users, task configuration apparatus 102 stores task configurations 142 that include those task parameters 110 in repository 120 and/or updates hierarchy 116 based on those task parameters 110.

Next, component configuration apparatus 104 performs component configurations 144 that are used to set up components 130 in a way that implements tasks 108 specified in task configurations 142. For example, component configuration apparatus 104 may provide a user interface that allows users assigned to specific tasks 108 and/or components 130 used to implement those tasks 108 to create data objects and/or specify other component parameters 112(1)-112(Y) (each of which his referred to individually as component parameters 112) that are used to customize the operation of components 130 for the users. As various sets of component parameters 112 are received from the users, component configuration apparatus 104 stores component configurations 144 that include those component parameters 112 in repository 120 and/or updates hierarchy 116 based on those component parameters 112.

Execution apparatus 118 then generates and executes a number of runbooks 124(1)-124(Z) (each of which is referred to individually as runbook 124) that carry out the functionality associated with task configurations 142 and component configurations 144 using the corresponding components 130 and modules 128 in software system 122. For example, execution apparatus 118 may create, schedule, and/or run processes in software system 122 that perform tasks 108 according to the corresponding task parameters 110 using components 130 that are configured using the corresponding component parameters 112.

In one or more embodiments, the system 100 may include more or fewer components than the components illustrated in FIG. 1. For example, task configuration apparatus 102, component configuration apparatus 104, and execution apparatus 118 may be implemented together and/or separately using one or more hardware and/or software components. Such components may include, but are not limited to, applications, servers, virtual machines, instrumentation, and/or other mechanisms for configuring and executing software system 122 on a real-time, near-real-time, and/or offline basis. Such components may be local to or remote from each other and/or distributed over multiple applications and/or machines. Multiple components may also be combined into one application and/or machine. Operations described with respect to one component may instead be performed by another component.

Additional embodiments and/or examples relating to computer networks are described below in Section 6, titled "Computer Networks and Cloud Networks."

As mentioned above, hierarchy 116, task configurations 142, and component configurations 144 are stored and/or defined within repository 120. In one or more embodiments, repository 120 is any type of storage unit and/or device (e.g., a file system, database, collection of tables, key-value store, collection of files, or any other storage mechanism) for storing data. Further, repository 120 may include multiple different storage units and/or devices. The multiple different storage units and/or devices may or may not be of the same type or located at the same physical site. For example, repository 120 may be implemented or may execute on the same computing system or environment as task configuration apparatus 102, component configuration apparatus 104, execution apparatus 118, and/or software system 122 or on a computing system or environment that is separate from task configuration apparatus 102, component configuration apparatus 104, execution apparatus 118, and/or software system 122. Repository 120 may be communicatively coupled to task configuration apparatus 102, component configuration apparatus 104, execution apparatus 118, and/or software system 122 via a direct connection or via a network. Further, repository 120 may include multiple different storage units and/or devices. The multiple different storage units and/or devices may or may not be of the same type or located at the same physical site.

In one or more embodiments, task configuration apparatus 102, component configuration apparatus 104, and execution apparatus 118 include hardware and/or software configured to perform operations described herein for optimizing the configuration and/or execution of software system 122 (or other types of systems). Examples of such operations are described below.

In an embodiment, the system of FIG. 1 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, an interface refers to hardware and/or software configured to facilitate communications between a user and task configuration apparatus 102, component configuration apparatus 104, execution apparatus 118, repository 120, and/or software system 122. The interface can render user interface elements and receive input via the user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the interface are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the interface is specified in one or more other languages, such as Java, C, or C++.

3. Usage-Based Optimization of Software Configurations

As mentioned above, task configuration apparatus 102, component configuration apparatus 104, and execution apparatus 118 use hierarchy 116 to track and/or manage the configuration, implementation, and execution of software system 122 for a set of users. Hierarchy 116 includes nodes 132 representing entities associated with the functionality and/or usage of software system 122. Hierarchy 116 also includes edges 134 representing relationships between entities represented by nodes 132.

For example, hierarchy 116 may include nodes 132 representing organizations, users, environments, applications, integrations, tasks 108, modules 128, components 130, workflows, features, activities, processes, and/or other entities involved in implementing or using software system 122. Nodes 132 may be arranged across multiple levels of hierarchy 116, with a node at a certain level of hierarchy 116 connected to one or more nodes 132 in a higher level of the hierarchy and/or one or more nodes 132 in a lower level of the hierarchy via a set of edges 134. An edge that connects a first node representing a first entity at a higher level in hierarchy 116 and a second node representing a second entity at a lower level in hierarchy 116 may indicate that the second entity is grouped under the first entity, belongs to the first entity, is managed by the first entity, is a part of the first entity, or has another type of relationship with the first entity.

Hierarchy 116 additionally includes metadata 136 associated with nodes 132 and/or edges 134. Metadata 136 identifies the entities represented by nodes 132 and/or the types of relationships represented by edges 134. Metadata 136 also includes attributes associated with the entities represented by nodes 132 and/or the types of relationships represented by edges 134. For example, metadata 136 for nodes 132 may include (but is not limited to) a name for each node, a type of entity (e.g., organization, user, user role, environment family, environment, application, type of task, task, feature, component, etc.) represented by the node, and/or additional attributes related to the entity. When a node represents a given task 108, module 128, component 130, and/or another portion of functionality implemented by software system 122, metadata 136 for the node may also include an indication of whether that portion is enabled or disabled for the set of users, whether the portion has been configured, parameters (e.g., task parameters 110, component parameters 112, etc.) used to configure that portion, one or more users or user roles assigned to configure or execute that portion, documentation related to configuration or use of that portion, and/or other information related to the use of that portion within software system 122. In another example, metadata 136 for edges 134 may include (but is not limited to) a type of relationship represented by each edge, a parent node connected by the edge, and/or a child node connected by the edge. Hierarchy 116 is described in further detail below with respect to FIG. 2.

In some embodiments, task configuration apparatus 102 and/or another component of the system create and/or instantiate hierarchy 116 for a given set of users based on a profile 114 associated with the users. For example, the component may include a user interface that requests and/or retrieves information that is used to populate profile 114 from one or more of the users. The information may include (but is not limited to) an industry, structure, size, location, and/or another attribute of an organization to which the users belong. The information may also, or instead, include demographic attributes, preferences, user roles, usage requirements, and/or other attributes of individual users of software system 122. In other words, profile 114 may include a high-level representation of the intended use of software system 122 by the users.

After profile 114 is created, the component matches attributes in profile 114 to a template for hierarchy 116 and uses profile 114 and the template to initialize hierarchy 116. For example, the component may create nodes 132 and/or edges 134 representing an organization and/or users in profile 114 and add attributes from profile 114 to metadata 136 for those nodes 132 and/or edges 134. The component may also perform a lookup of a template that corresponds to a "best match" with some or all attributes in profile 114 in repository 120 and/or another data store. The component may then populate hierarchy 116 with nodes 132, edges 134, and/or metadata 136 from the template. A first set of nodes 132 in hierarchy 116 may represent tasks 108 that can be performed using software system 122, a second set of nodes 132 in hierarchy may represent components 130 that implement those tasks 108, and edges 134 between the first set of nodes 132 and the second set of nodes 132 may identify a set of components 130 used to implement each task 108. Metadata 136 for these nodes 132 and/or edges 134 may include "default values" for attributes associated with tasks 108 and/or components 130, such as whether a given task or component is required, enabled, or disabled and/or a user or user role that is assigned to the configuration or execution of a given task or component.

Next, task configuration apparatus 102 uses information stored in hierarchy 116 to perform task configurations 142 of tasks 108 for the users. As shown in FIG. 1, task configuration apparatus 102 generates one or more visualizations 106 related to tasks 108 and/or hierarchy 116. For example, task configuration apparatus 102 may generate a graphical user interface (GUI), web-based user interface, touch user interface, and/or another type of user interface. Task configuration apparatus 102 may also display, within the user interface, a list of tasks 108 that can be performed using software system 122; a list of components 130 that implement functionality associated with individual tasks 108; a tree view of one or more portions of hierarchy 116; a preview of various components 130 and/or modules 128 in software system 122 that reflect task configurations 142, component configurations 144, and/or other elements of hierarchy 116; documentation associated with tasks, components 130, and/or modules 128; and/or other types of visualizations 106 associated with configuration of software system 122 by the users.

Task configuration apparatus 102 also uses visualizations 106 and/or user interface components associated with visualizations 106 to obtain task parameters 110 that are used to configure various tasks 108 for the users. For example, task configuration apparatus 102 may include user-interface elements that allow a user to switch between different types of visualizations 106; browse, search for, and/or filter tasks 108, components 130, nodes 132, edges 134, and/or metadata 136 within visualizations 106; select specific tasks 108 within visualizations 106; and/or otherwise interact with visualizations 106. After a user has selected a given task 108, task configuration apparatus 102 may generate form fields, sliders, drop-down menus, radio buttons, checkboxes, and/or other user-interface components that allow the users to specify task parameters 110 that are used to configure that task 108. Task parameters 110 may include one or more users assigned to that task 108, an adoption method for that task 108 (e.g., how data collection is performed for that task 108), and/or other parameters 110 that represent higher-level usage associated with that task 108. Task parameters 110 may also, or instead, specify whether that task 108 and/or individual components 130 used to perform that task 108 are enabled or disabled.

After a given set of task parameters 110 has been submitted by a user, task configuration apparatus 102 stores the set of task parameters 110 in one or more task configurations 142 within repository 120. For example, task configuration apparatus 102 may store each set of task parameters 110 in one or more database records, database tables, data structures, files, and/or other representations of a corresponding task configuration. Task configuration apparatus 102 also, or instead, updates hierarchy 116 and/or visualizations 106 to reflect the received task parameters 110. For example, task configuration apparatus 102 may update nodes 132, edges 134, and/or metadata 136 in hierarchy 116 and/or one or more visualizations 106 of hierarchy to indicate tasks 108 and/or components 130 that have been enabled or disabled, users or user roles assigned to various tasks 108 and/or components 130, an adoption method for a given task 108, and/or other task parameters 110. In another example, task configuration apparatus 102 may generate updated previews of components 130 and/or modules 128 in software system 122 that reflect the latest task parameters 110.

Consequently, task configuration apparatus 102 allows users to learn about the capabilities of software system 122, select specific subsets of capabilities that are relevant to the users' preferences and needs, perform high-level task configurations 142 related to the selected capabilities, and understand how task configurations 142 affect the user experience with and/or functionality of software system 122. Task configuration apparatus 102 additionally uses hierarchy 116 to track task configurations 142 and link task configurations 142 to users, user roles, components 130, and/or other entities involved in implementing or using the corresponding capabilities.

After a user has completed task configurations 142 via interaction with task configuration apparatus 102, component configuration apparatus 104 uses hierarchy 116 and/or task configurations 142 to identify a set of components 130 to be configured and/or implemented. For example, component configuration apparatus 104 may use nodes 132, edges 134, and/or metadata 136 in hierarchy 116 to identify components 130 that are required to perform tasks 108 that have been enabled in task configurations 142 and/or individual components 130 that have been enabled through task configurations 142.

Component configuration apparatus 104 also obtains component parameters 112 that are used to configure each component 130 that is required to implement a given task 108 and/or that has been enabled in task parameters 110. For example, component configuration apparatus 104 may generate a user interface that allows users assigned to various tasks 108 to specify component parameters 112 for components 130 that are required to perform those tasks 108 and/or components 130 that are otherwise enabled.

After a given set of component parameters 112 has been submitted by a user, component configuration apparatus 104 stores the set of component parameters 112 in one or more component configurations 144 within repository 120. For example, component configuration apparatus 104 may store each set of component parameters 112 in one or more database records, database tables, data structures, data objects, files, and/or other representations a corresponding component configuration. Task configuration apparatus 102 and/or component configuration apparatus 104 also, or instead, update hierarchy 116 and/or visualizations 106 to reflect the received component parameters 112. For example, component configuration apparatus 104 may update nodes 132, edges 134, and/or metadata 136 in hierarchy 116 and/or one or more visualizations 106 of hierarchy to include a given set of component parameters 112 and/or indicate that the corresponding component(s) have been configured. In another example, task configuration apparatus 102 may generate updated previews of components 130 and/or modules 128 in software system 122 that reflect the latest component parameters 112.

After configuration of tasks 108 and components 130 that implement tasks 108 is complete, execution apparatus 118 uses hierarchy 116 to orchestrate the setup of various runbooks 124 that carry out tasks 108 for the users. For example, execution apparatus 118 may use nodes 132, edges 134, and/or metadata 136 in hierarchy 116 to identify tasks 108 and/or components 130 that have been enabled and configured by the users. Execution apparatus 118 may also use nodes 132, edges 134, and/or metadata 136 to set up, schedule, or automate processes that carry out tasks 108 using the corresponding configured components 130.

Consequently, hierarchy 116 represents a "map" that is used to guide, track, and visualize the end-to-end process of determining the usage of the software system by a set of users, configuring the software system for use by the users, and executing the software system. As described in further detail below with respect to FIG. 2, this map can be used to define user roles, applications, categories of activities that can be conducted using the applications, tasks performed using the applications, components involved in implementing the task, infrastructure requirements, and/or other entities or elements that are involved in adapting the software system for a given set of users.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 2:
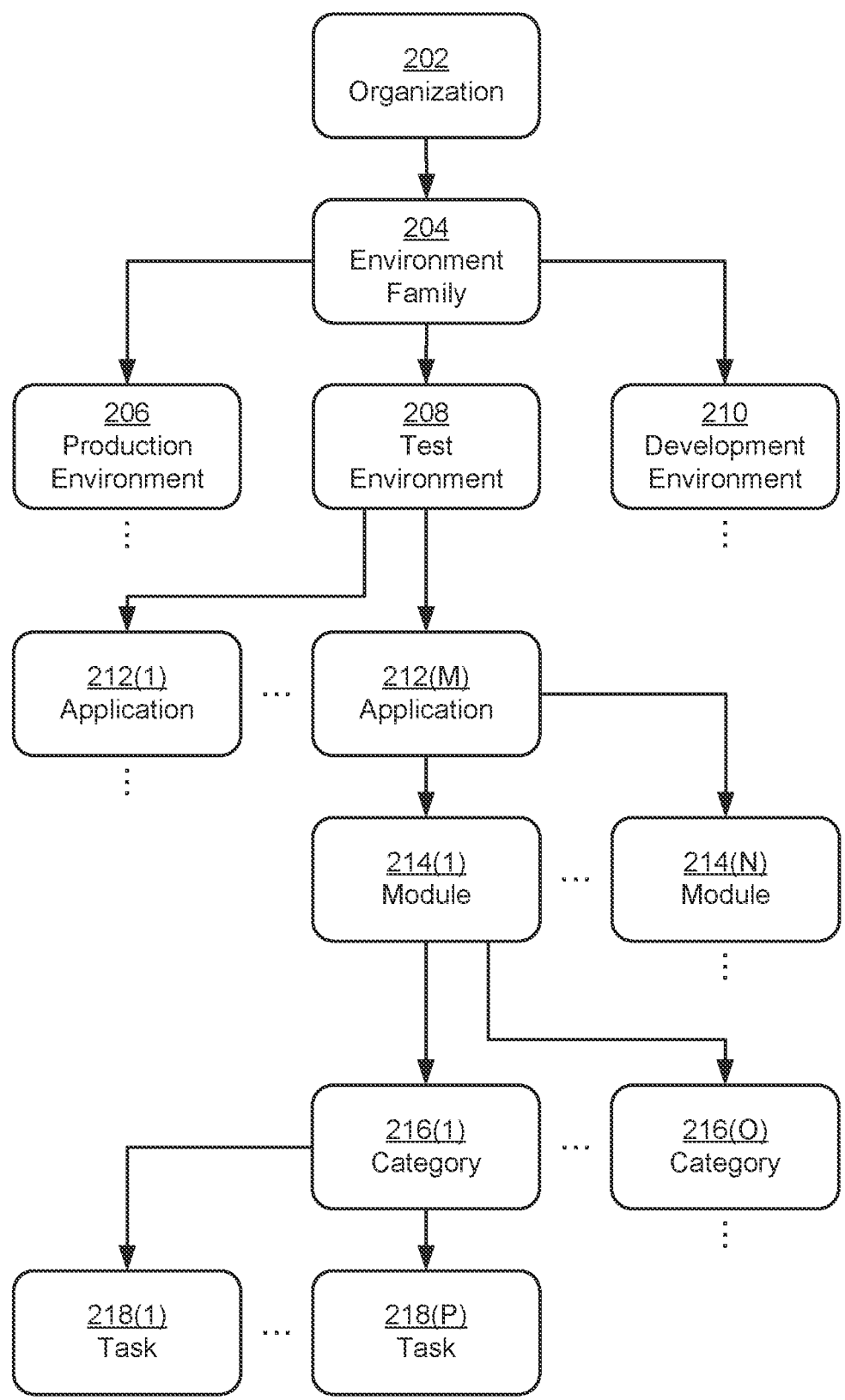
FIG. 2 illustrates an example hierarchy of entities representing usage of a software system in accordance with one or more embodiments.

FIG. 2 illustrates an example hierarchy (e.g., hierarchy 116 of FIG. 1) of entities associated with usage of a software system in accordance with one or more embodiments. As shown in FIG. 2, the example hierarchy includes a number of nodes that are organized into multiple levels and connected with one another via parent-child relationships.

In particular, the hierarchy of FIG. 2 includes a node that resides at the highest level and represents an organization 202 that uses the software system. For example, organization 202 may include a company, an educational institution, an association, a group, and/or another entity that includes or represents a set of users.

The top-level node representing organization 202 is connected to another node that resides one level down in the hierarchy and represents an environment family 204. Environment family 204 includes multiple environments that are used to execute the software system for organization 202. As a result, the node representing environment family 204 is connected to three lower-level child nodes that represent a production environment 206, a test environment 208, and a development environment 210 for the software system, respectively.

The node representing test environment 208 is connected to one or more lower-level nodes that represent applications 212(1)-212(M) (each of which is referred to individually as application 212) that execute within test environment 208. Nodes representing production environment 206 and development environment 210 can also be connected to similar lower-level nodes (not shown) representing applications that execute within those environments.

The node representing application 212(M) is connected to one or more lower-level nodes that represent functional modules 214(1)-214(N) (each of which is referred to individually as module 214) within that application 212(M). Additional nodes representing other applications 212 can also be connected to similar lower-level nodes (not shown) representing functional modules within those applications.

The node representing module 214(1) is connected to one or more lower-level nodes that represent categories 216(1)-216(O) (each of which is referred to individually as category 216) of capabilities or activities associated with module 214(1). For example, categories 216 of activities associated with a payroll processing module may include (but are not limited to) data collection, data processing, exception handling, approval, monitoring, and/or data transfer. Additional nodes representing other modules 214 can also be connected to similar lower-level nodes (not shown) representing categories of capabilities or activities associated with those modules.

The node representing category 216(1) is connected to one or more lower-level nodes that represent tasks 218(1)-218(P) (each of which is referred to individually as task 218) grouped under that category 216(1). Continuing with the above example, tasks 218 that are grouped under the category of data collection for a payroll processing module may include (but are not limited to) managing payroll definitions, loading time cards, loading absences, managing cost allocations, managing third parties, managing payroll relationships, configuring payroll flows, managing payment methods, managing third parties, and/or managing earnings and deductions. Additional nodes representing other categories 216 can also be connected to similar lower-level nodes (not shown) representing tasks that are grouped under those categories.

Each node representing a corresponding task 218 can store metadata that indicates whether the task is enabled or disabled, one or more users or user roles assigned to the task, a list of components that implement the task, whether each component in the list is enabled or disabled, and/or whether each component has been configured. Each node representing a corresponding task 218 can also, or instead, be connected to one or more lower-level nodes (not shown) representing one or more components used to implement that task.

As mentioned above, the hierarchy can be initialized based on a profile or template associated with organization 202 and/or one or more users in organization 202. For example, the hierarchy may be populated with nodes representing organization 202, environment family 204, production environment 206, test environment 208, development environment 210, applications 212, modules 214, categories 216, and/or tasks 218 from a template that is matched to a location, size, industry, structure, and/or another attribute of organization 202. Metadata for individual nodes and/or edges in the hierarchy may also be initialized with "default values" from the template and/or attributes from the profile.

The hierarchy can be updated based on task configurations and/or component configurations that are used to customize and/or optimize the software system for organization 202 and/or users in organization 202. For example, the task configurations may be used to enable or disable individual tasks 218 for organization 202 and/or enable or disable individual components that are used to implement each task 218. When a configuration for a given task or component is received, metadata for a node representing the task or component is updated with information from the configuration. Consequently, the hierarchy provides a centralized and up-to-date view of tasks 218 that represent intended use of the software system by organization 202, components that are required to implement those tasks 218 or otherwise enabled, and/or configurations related to tasks 218 and components.

Various visual representations associated with the hierarchy can also be generated and outputted to users. These visual representations include (but are not limited to) a list of tasks 218 that can be performed using the software system; a list of components that implement functionality associated with individual tasks 218; a tree view of one or more portions of the hierarchy; a preview of components and/or modules that reflect the corresponding configurations; and/or documentation associated with tasks 218, components, and/or modules. A user can browse, search for, and/or filter nodes, edges, and/or metadata from a given visualization. The visualization shown to a user can also reflect the role of the user and/or other attributes associated with the user. For example, the visualization that is shown to a user who is responsible for defining the usage of the software system may include nodes that represent applications 212, modules 214, categories 216, and/or tasks 218 associated with the usage. Conversely, the visualization that is shown to a user who is responsible for performing a task or configuring a component that is used to implement the task may include nodes that represent the task and/or components grouped under the task.

5. Optimizing a Configuration of a Software System

Figure 3:
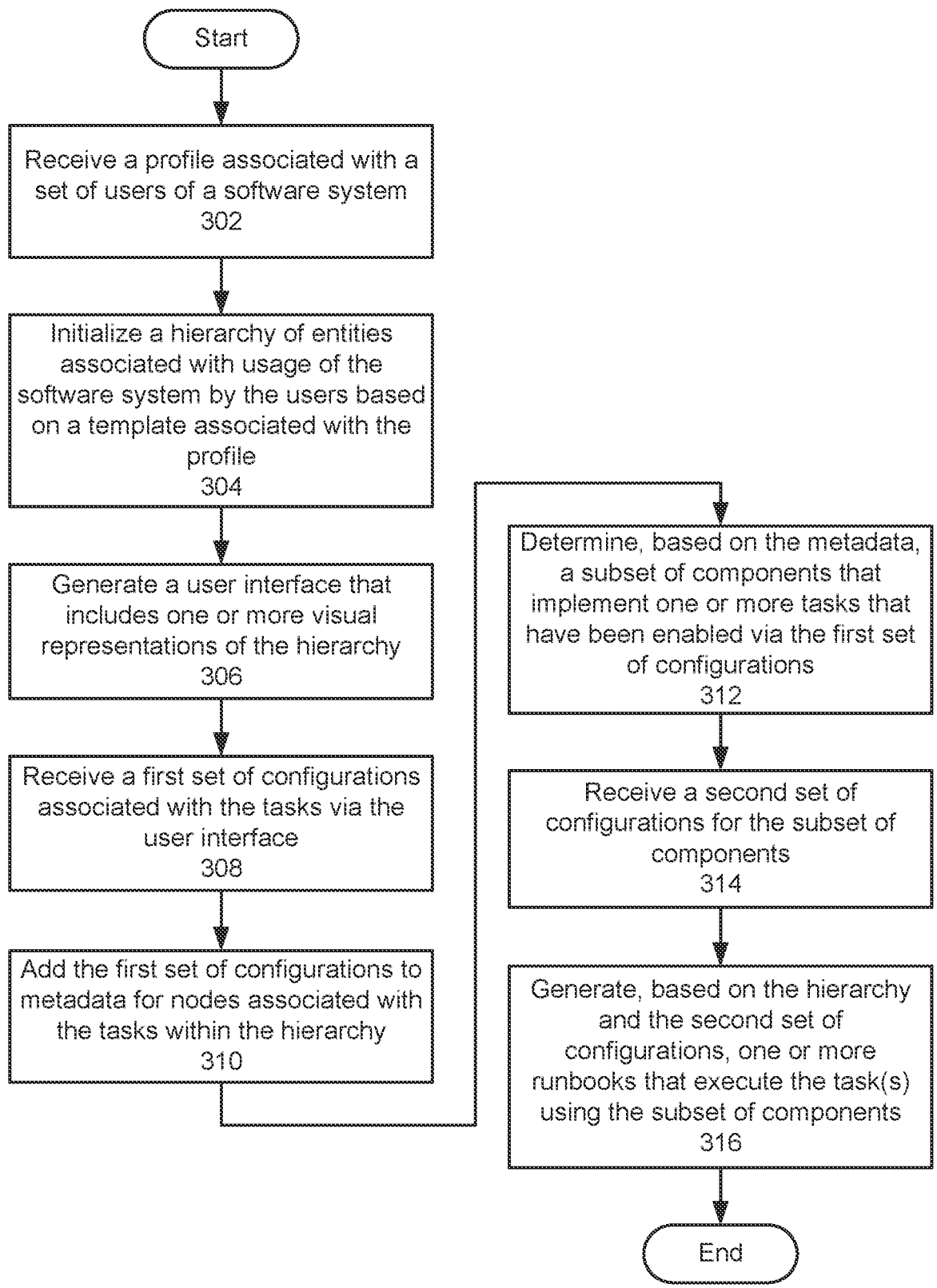
FIG. 3 illustrates a flowchart of configuring a software system in accordance with one or more embodiments.

FIG. 3 illustrates a flowchart of configuring a software system in accordance with one or more embodiments. In one or more embodiments, one or more of the steps may be modified, omitted, repeated, and/or performed in a different order. Accordingly, the specific arrangement of steps shown in FIG. 3 should not be construed as limiting the scope of one or more embodiments.

Initially, a profile associated with a set of users of the software system is received (operation 302). For example, the profile may be obtained from one or more users during initial configuration of the software system. The profile may include an industry, location, size, structure, and/or another attribute of an organization representing the users. The profile may also, or instead, include attributes of the users, usage requirements associated with the organization and/or users, and/or preferences associated with the organization and/or users.

Next, a hierarchy of entities associated with usage of the software system by the users is initialized based on a template associated with the profile (operation 304). For example, some or all attributes of the users and/or organization in the profile may be matched to the template, and the hierarchy may be populated with attributes from the profile and/or nodes, edges, and/or metadata in the template. The nodes may represent the organization, users, environments, applications, modules, tasks, components, and/or other entities involved in implementing or using the software system. The edges may represent relationships between entities represented by the corresponding nodes. The metadata may include attributes, statuses, and/or other information related to the corresponding entities and/or relationships.

The hierarchy is used to coordinate and/or track the subsequent configuration, implementation, and/or execution of the software system. In particular, the usage of the software system by the users is defined by generating a user interface that includes one or more visual representations of the hierarchy (operation 306), receiving a first set of configurations associated with the tasks via the user interface (operation 308), and adding the first set of configurations to metadata for nodes associated with the tasks within the hierarchy (operation 310). For example, the user interface may display a list of tasks, a list of components that implement a given task, a tree view of the hierarchy, a preview of the software system, documentation associated with a task in the set of tasks, and/or other visual representations of the hierarchy and/or information stored in the hierarchy. When a task is selected within a visual representation, the user interface may be updated to include user interface elements that receive a set of configuration parameters associated with the task from a user. The configuration parameters may include an enabling of the task, a disabling of the task, an enabling of a component that implements the task, a disabling of a component that implements the task, an adoption method associated with the task, a user that implements the task, and/or a user role that implements the task. The configuration parameters may then be added to metadata for a node associated with the task, one or more nodes representing components that implement the task, and/or other nodes or edges related to the task within the hierarchy.

After the usage of the software system has been defined using the first set of configurations, the software system is configured and executed according to the defined usage. More specifically, a subset of components that implement one or more tasks that have been enabled via the first set of configurations is identified (operation 312), and a second set of configurations for the subset of components is received (operation 314). For example, one or more nodes in the hierarchy that indicate that the corresponding task(s) are enabled may be identified, and edges that connect the identified node(s) to one or more additional nodes that represent the subset of components may be used to determine the subset of components used to implement the enabled task(s). Information from the first set of configurations may also be used to identify a user or user role that is assigned to a configuration of each of the components, and a user interface and/or another mechanism may be used to receive the configuration of the component from the user or user role.

Finally, one or more runbooks that execute the task(s) using the subset of components are generated based on the hierarchy and the second set of configurations (operation 316). For example, metadata in the hierarchy may be used to schedule, set up, run, and/or monitor processes that use the configured components to execute the task(s).

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
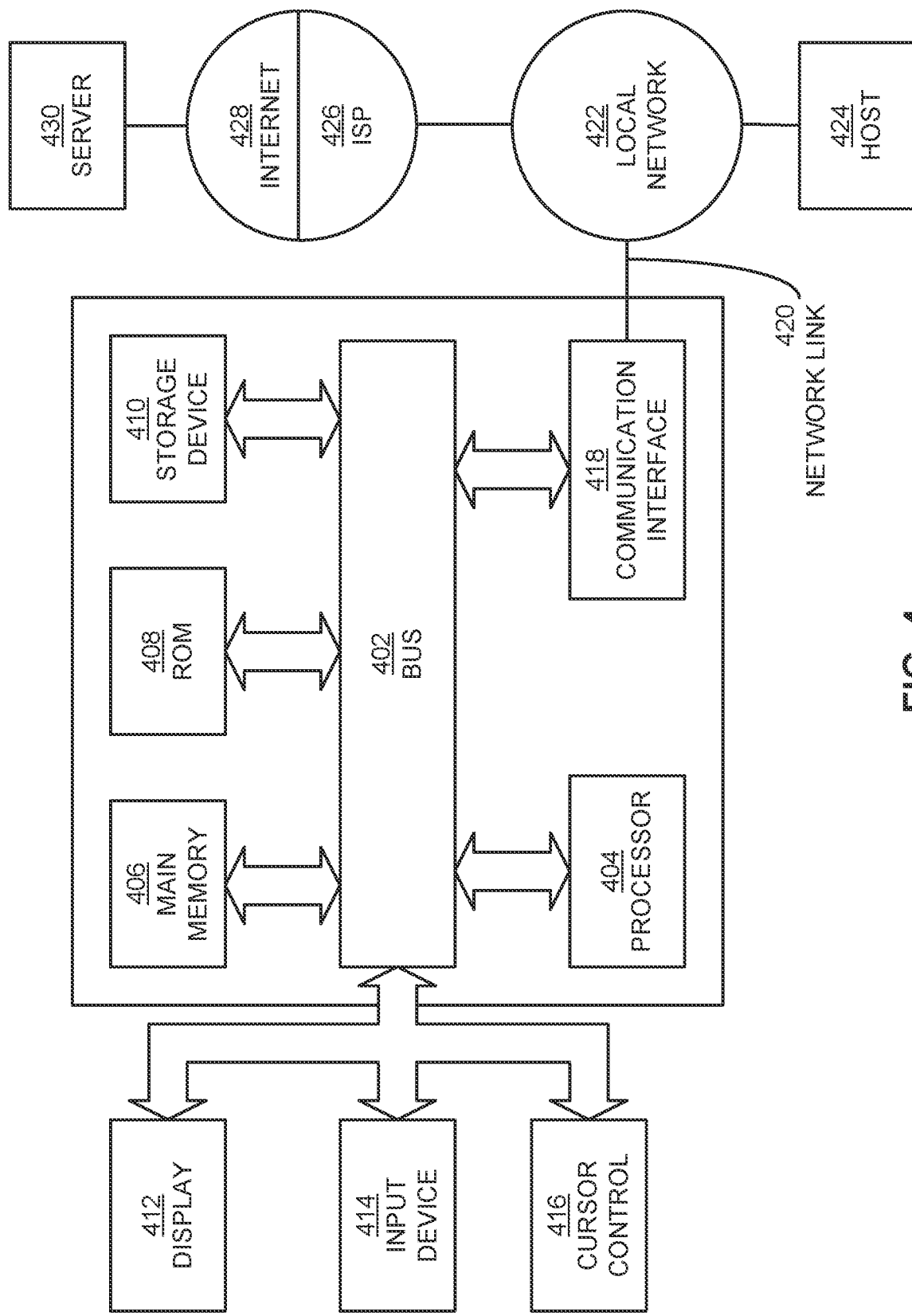
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable storage medium comprising instructions which, when executed by one or more hardware processors, causes performance of operations comprising:
   generating a hierarchy of entities representing usage of a software system by a set of users, wherein the hierarchy includes a first set of nodes representing a set of tasks, a second set of nodes representing a set of components that implement the set of tasks, and a set of edges between the first set of nodes and the second set of nodes;
   updating the hierarchy based on a first set of configurations associated with the set of tasks, wherein the updated hierarchy indicates one or more tasks within the set of tasks that have been enabled for the set of users;
   wherein updating the hierarchy based on the first set of configurations comprises:
      generating a user interface that includes a visual representation of the hierarchy; and
      receiving the first set of configurations via the user interface;
   determining, based on the updated hierarchy, one or more components that implement the one or more tasks and are included in the set of components; and
   generating, based on the updated hierarchy, one or more runbooks that execute the one or more tasks using the one or more components.

2. The medium of claim 1, wherein updating the hierarchy based on the first set of configurations further comprises updating metadata associated with the first set of nodes or the second set of nodes with the first set of configurations.

3. The medium of claim 1, wherein receiving the first set of configurations via the user interface comprises:
   detecting a selection of a task within the visual representation; and
   generating a portion of the user interface that receives a set of configuration parameters associated with the task.

4. The medium of claim 3, wherein the set of configuration parameters comprises at least one of an enabling of the task, a disabling of the task, an enabling of a component that implements the task, a disabling of a component that implements the task, an adoption method associated with the task, a user that implements the task, or a user role that implements the task.

5. The medium of claim 1, wherein the visual representation comprises at least one of a list of the set of tasks, a list of a components that implement a task, a tree view of the hierarchy, a preview of the software system, or documentation associated with a task in the set of tasks.

6. The medium of claim 1, wherein generating the hierarchy comprises:
   determining a profile associated with the set of users; and
   adding the first set of nodes, the second set of nodes, and the set of edges to the hierarchy based on a template associated with the profile.

7. The medium of claim 6, wherein the profile comprises at least one of an industry, a structure, an entity size, or a location.

8. The medium of claim 1, further comprising:
   receiving a second set of configurations for the one or more components; and
   generating the one or more runbooks based on the second set of configurations.

9. The medium of claim 8, wherein receiving the second set of configurations comprises:
   identifying, based on the first set of configurations, a user role that is assigned to a configuration of a component in the one or more components; and
   receiving the configuration of the component from a user associated with the user role.

10. The medium of claim 9, wherein the user role comprises at least one of an administrator, a manager, an end user, or a system user.

11. The medium of claim 1, wherein determining the one or more components that implement the one or more tasks comprises:
    determining one or more nodes in the hierarchy that represent the one or more tasks; and
    identifying, within the updated hierarchy, one or more additional nodes that represent the one or more components and are connected to the one or more nodes via a subset of the set of edges.

12. The medium of claim 1, wherein the hierarchy further comprises a third set of nodes representing at least one of the set of users, an organization associated with the set of users, one or more environments in which the software system executes, or one or more functional modules within the software system.

13. The medium of claim 1, wherein the hierarchy further comprises a third set of nodes representing a set of categories under which the set of tasks is grouped.

14. The medium of claim 13, wherein the set of categories comprises at least one of data collection, data processing, exception handling, approval, monitoring, or data transfer.

15. A method, comprising:
    generating a hierarchy of entities representing usage of a software system by a set of users, wherein the hierarchy includes a first set of nodes representing a set of tasks, a second set of nodes representing a set of components that implement the set of tasks, and a set of edges between the first set of nodes and the second set of nodes;
    updating the hierarchy based on a first set of configurations associated with the set of tasks, wherein the updated hierarchy indicates one or more tasks within the set of tasks that have been enabled for the set of users;
wherein updating the hierarchy based on the first set of configurations comprises:
generating a user interface that includes a visual representation of the hierarchy; and
receiving the first set of configurations via the user interface;
determining, based on the updated hierarchy, one or more components that implement the one or more tasks and are included in the set of components; and
generating, based on the updated hierarchy, one or more runbooks that execute the one or more tasks using the one or more components.

16. The method of claim 15, wherein the visual representation comprises at least one of a list of the set of tasks, a list of a components that implement a task, a tree view of the hierarchy, a preview of the software system, or documentation associated with a task in the set of tasks.

17. The method of claim 15, wherein the hierarchy further comprises a third set of nodes representing at least one of the set of users, an organization associated with the set of users, one or more environments in which the software system executes, one or more functional modules within the software system, or a set of categories under which the set of tasks is grouped.

18. An apparatus, comprising:
one or more processors; and
memory storing instructions that, when executed by the one or more processors, cause the apparatus to perform the steps of:
generating a hierarchy of entities representing usage of a software system by a set of users, wherein the hierarchy includes a first set of nodes representing a set of tasks, a second set of nodes representing a set of components that implement the set of tasks, and a set of edges between the first set of nodes and the second set of nodes;
updating the hierarchy based on a first set of configurations associated with the set of tasks, wherein the updated hierarchy indicates one or more tasks within the set of tasks that have been enabled for the set of users;
wherein updating the hierarchy based on the first set of configurations comprises:
generating a user interface that includes a visual representation of the hierarchy; and
receiving the first set of configurations via the user interface;
determining, based on the updated hierarchy, one or more components that implement the one or more tasks and are included in the set of components; and
generating, based on the updated hierarchy, one or more runbooks that execute the one or more tasks using the one or more components.

* * * * *